United States Patent Office 3,089,085
Patented May 7, 1963

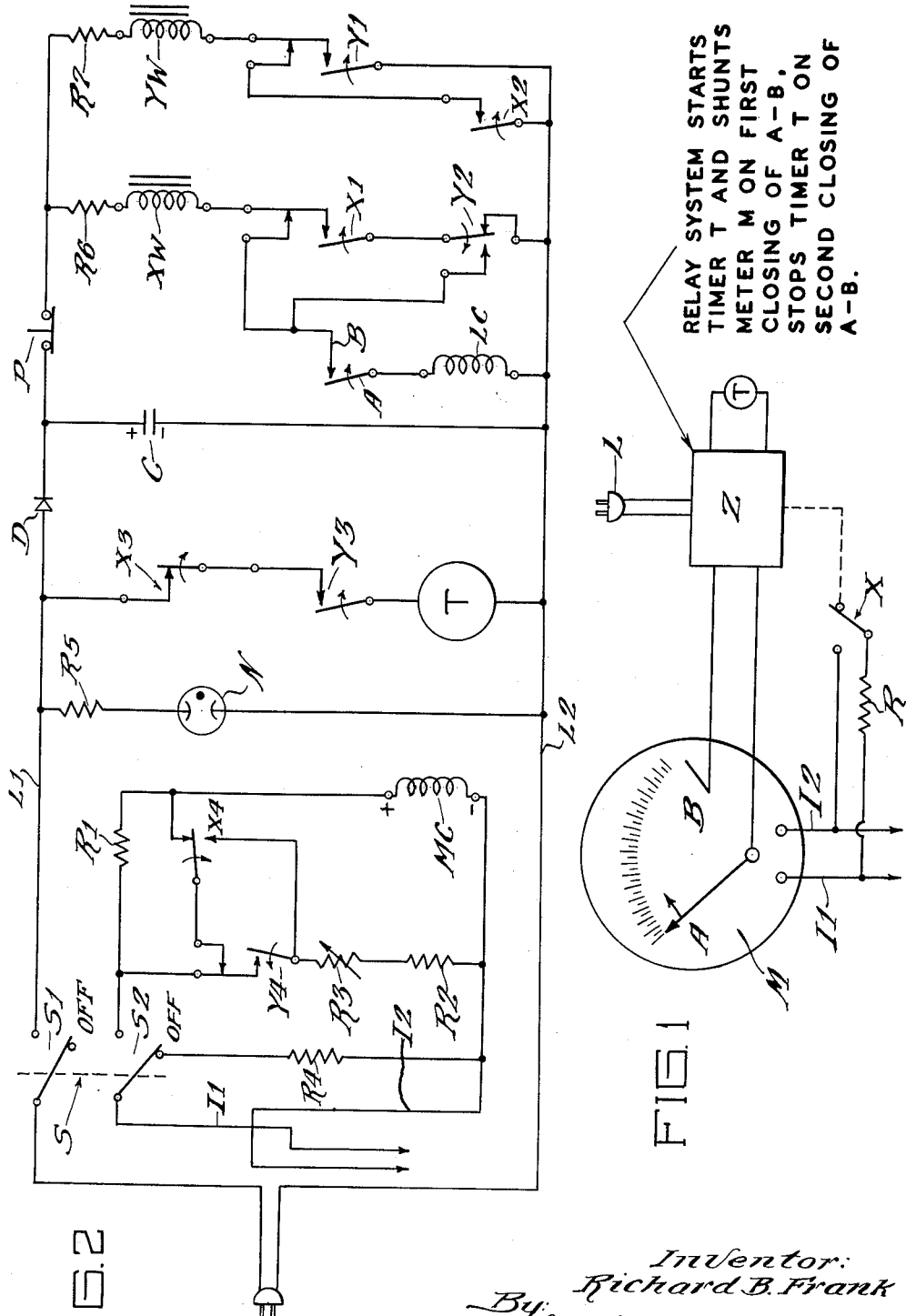

3,089,085
SIGNAL-CONTROLLED TIMER
Richard B. Frank, Chicago, Ill., assignor to Nuclear-Chicago Corporation, Cook County, Ill., a corporation of Delaware
Filed Apr. 6, 1959, Ser. No. 804,400
12 Claims. (Cl. 324—68)

This invention relates to timers, and more specifically to a timer for indicating the rate of change of an electrical quantity such as current or voltage.

The timer of the present invention is employed for the automatic measurement and indication of the elapsed time required for a given change of magnitude of an input signal between predetermined lower and upper limits. The specific embodiment herein to be described is designed particularly for timing the rate of charge or discharge of an ionization chamber employed in radioactivity measurements. In a common type of such measurement, employed with very weak sources of radioactivity, the intensity of a radioactivity source under measurement is determined by measuring the time required for charge or discharge of an ionization chamber between particular values. Such measurements normally employ measuring or detecting devices of very high impedance, such as dynamic condenser electrometers, the output of which, after suitable amplification, constitutes an indication of the state of charge of the ionization chamber. Where sources of very low intensity are under measurement, the amount of time required for the making of an accurate measurement of the charge growth or decay is frequently prohibitively large to permit making of the measurement by direct observation by the operator of the voltage values as indicated on a suitable meter, accompanied by manual operation of a timer. It is thus customary in making measurements of this type to employ a recording instrument to continuously record the output of the electrometer system on a chart or tape. The chart or tape being calibrated in terms of time, it may be removed at any convenient time after sufficient lapse for accuracy of the measurement and the relation of time to charge determined from the tape or chart. Such a tape or chart recorder, however, is an extremely expensive item of equipment. Where a permanent record of intermediate values is of little or no importance, as in cases where the electrical quantity under measurement is known to follow a curve of known shape, so that the only measurements of primary interest are made at the beginning and end of the period timed, most of the information provided by the expensive mechanism of the recording instrument is useless.

An obvious manner of timing the interval required for a particular change in an electrical quantity under measurement is the employment of a relay which is actuated by the operator in the initial operation of setting up the measurement and is responsive to reaching of a predetermined value by the quantity under measurement to stop a timer to which it is coupled, thus constituting the indication of the timer an indication of the elapsed time required for the voltage or other electrical quantity to change from the value established at the time of initiation of the measurement (the discharged or fully charged states of the ionization chamber in the case mentioned) to another fixed value of the voltage. It is found, however, that such a device is not capable of giving satisfactory measurements of the ionization chamber type discussed. In general, the commencement of operation is accompanied by transient and non-linear effects which are desirably eliminated from the measurement. It is thus customary, in determining such time rates of change from the record of a recording instrument, to disregard the first portion of the record in determining the steady-state time rate of change. Similarly, when the measurement is made directly by the operator, rather than automatically, it is customary to make the measurement, for example, of the time required for a panel instrument to go from 10 percent to 100 percent of full-scale, the first 10 percent being disregarded in the making of the measurement.

The elimination from the measurement of the transient associated with the commencement of operation may of course be accomplished by introducing a time delay between the time of actuation by the operator and the time of commencement of the operation of the timer in the simple type of relay system heretofore described. The difficulty with such a solution to the problem, however, is that the use of a constant time delay will produce a non-linear relation between the actual rate of change of the electrical quantity and the indication given by the timer. An additional objection is that the employment of a fixed time delay for actuation of the timer will either preserve the errors due to transient effects which occur in the first portion of the charge or discharge operation, when measurements of very slow rates of change are involved, or will, if the time delay is selected to eliminate this error, require an excessive time for the making of measurements of fast rates of change, since in such cases the actual measurement may take a lesser time than the fixed time delay designed for slow rates of change. Additionally, of course, the meaningfulness of the rate of change indication produced by such a system is limited to cases where the exact shape of the change curve as a function of time is known.

Another obvious, but much more complex, solution is the employment of two substantially independent relays, one being tripped to start the timer at a particular value of voltage, and the other being tripped to stop the timer at another value of voltage. A difficulty with such a system, however, in addition to its complexity, is the possibility of error, since any drift between measurements in either of the sensitivities upsets the predetermined relation between the sensitivities, and thus creates error in the measurement. Thus with such a system it is found necessary to constantly recalibrate despite the fact that absolute drift is unimportant where, for example, the measurement of concern is merely the time required for the voltage to rise from 10 percent to 100 percent of any arbitrarily selected value, the absolute amounts of the two terminal conditions being inconsequential.

The present invention employs the fact that absolute values in this type of measurement are of little significance to produce a simple automatic timer for this purpose which is essentially completely devoid of errors due to drift occurring between measurements, the timer of the present invention being reliably actuated at any preselected value of the input variable and de-energized when the variable reaches a fixed multiple of the first value. The elimination from the measurement of the effects of extraneous factors which are not required to be considered in the desired measurement permits the construction of a relatively simple and inexpensive device for performance of the desired type of measurement, without any sacrifice of accuracy and reliability.

In its most general aspects, the present invention employs, for the actuation of an ordinary elapsed-time timer, a signal-controlled switch which is adapted to operation in response to a given signal magnitude; simultaneously with the actuation of the timer, the sensitivity of the switch itself is altered to substantially immediately inactivate the switch without stopping the timer, and means are then provided responsive to a second actuation of the switch to stop the timer. In this manner, the accuracy of the measurement is as stable as the sensitivity ratio of the two conditions of the switch, but is independent of any drift in the absolute sensitivity of the switch occurring between measurements or of drifts in the relation between the input signal and the quantity actually under measurement ocurring between measurements.

This construction is employed to greatest advantage by incorporating as the signal-responsive switch a device of the type commonly known as "contact meter" or "meter relay." In such a device, there is coupled to the indicator of a conventional type of meter a moving contact which cooperates with a fixed contact to close a circuit when the input value reaches a set quantity (the stationary contact being adjustable in position). The employment of this type of switch in the system of the invention offers numerous advantages. The reading of the meter before the commencement of, or during, the interval being timed, permits the interpolation by the operator of additional data in addition to the timing interval measurement for which the device is primarily designed. Such a switch or relay, which commonly employs a D'Arsonval movement, is highly sensitive, requiring a minimum of power input for its operation and thus simplifying the amplifier system interposed between the ultimate quantity whose change is being measured (such as the charge of an ionization chamber) and the input to the switch or relay. Further, such a relay is extremely stable as regards exactness of the input quantity which closes the switch. The sensitivity is readily altered by the employment of a suitable shunt for the movement. Since in the device of the invention the accuracy of the measurement is independent of absolute values of the input signal, the stability and reproducibility of the system of the invention are extremely high when such a relay-type meter is employed as the switch.

For more complete understanding of the invention, reference is made to the embodiment thereof illustrated in the attached drawing, in which:

FIGURE 1 is a diagrammatic representation of a signal-controlled timer embodying the invention; and FIGURE 2 is a schematical electrical diagram showing certain details of a particularly advantageous embodiment of the device shown in diagrammatic form in FIGURE 1.

Referring first to FIGURE 1, there is indicated by the designation M a contact meter or meter relay having a movable contact A secured to the indicator thereof and a stationary contact B, the switching action being accomplished when the voltage or current input at the input terminals I1 and I2 reaches the proper value. In the embodiment herein described, the input increases in value during the timing interval, but adaptation to decreased input values will readily be made.

Closing of the contacts A and B establishes a circuit connected to a relay system, generally designated Z, which is powered from a line source L. The relay system Z controls a timer T and also includes (as indicated by the dotted line in FIGURE 1) relay-controlled contacts X which selectively switch a resistance shunt R across the meter input. The relay system starts the timer T and shunts the meter M on the first closing of contacts A and B, and stops the timer T on the second closing of contacts A and B.

The shunt R, when in the meter circuit, reduces the sensitivity of the meter by a suitable factor such as 10. It will be seen that when the input terminals I1 and I2 are connected to a current input of increasing value, the timer will be started when the contact A strikes the contact B. At the same time, however, the shunt will reduce the sensitivity of the meter, so that the meter needle will immediately fall to 10 percent (in the example cited) of its value at the time of contact. The timer will then run until the second contact is made between contacts A and B.

The schematic diagram of FIGURE 2 illustrates the system of FIGURE 1 in more detailed form particularly as regards the relay system. As seen in FIGURE 2, the device is connected to the source of line power L through a double-pole double-throw on-off switch S. One pole S1 is connected to the relay system, and the other pole S2 is connected in the meter circuit, the relay system and the meter circuit being separate except for the presence of relay contacts in the meter circuit, to be described later.

Considering first the meter circuit, it will be seen that in the "on" position of the switch pole S2, resistor R1 is connected in series with a meter signal coil MC of a meter relay across the input terminals I1 and I2. Additionally there are provided a fixed shunt resistance R2 and a trimmer resistance R3 in series therewith, this series combination corresponding to the resistance R of FIGURE 1. One end or terminal of this shunt resistance is connected to one side of the input I2, and the other terminal is connected into the circuit through relay contacts later to be described. As will be seen more fully below, the relay contacts establish two steady-state conditions for the meter circuit, one in which the input signal is impressed directly across the meter, with the series resistance R1 shorted out and the circuit of the shunt resistance open, and one in which the resistance R1 is in series with the meter signal coil MC, this series combination being shunted by the resistances R2 and R3 to form a combination reducing the sensitivity of the meter by a factor of 10 while holding constant the input resistance seen between the input terminals I1 and I2.

In the "off" condition of the meter circuit switch pole S2, a resistance R4 is the sole element connected across the input terminals, and is chosen with a value equal to the input resistance which the meter coil circuit possesses in either of its conditions in the "on" position. Thus the impedance or resistance presented by the system to the input terminals is constant in all phases of operation of the system, so that proper operation of the signal source is not affected.

An example of the values employed in a particular commercial embodiment of the device of FIGURE 2 is as follows: The resistances R1, R2 and R3 are 8200 ohms, 820 ohms, and 400 ohms (variable), respectively, the meter relay having a coil resistance of 950 ohms and a sensitivity of 100 microamperes fullscale, the resistance R4 being substantially equal to this value so that the input impedance is substantially constant on all scales.

The relay system is connected directly across the power line L1—L2. It is provided with an indicator lamp N with the usual series resistance R5. The timer T is connected across the line in series with relay contacts to be described below. Relay power is supplied by direct voltage provided by a diode D and shunt condenser C. A resetting switch P is provided for opening the power circuits of relay coils XW and YW, which have in series therewith current-limiting resistors R6 and R7, respectively.

In the drawing, and in the description which follows, the contacts associated with the relay winding XW are identified by the letter X followed by an identifying numeral and the contacts associated with the relay winding YW are identified in analogous fashion. In the drawing, all of the relay contacts are illustrated in their normal or unenergized position, arrows indicating the direction of motion when the windings are energized.

The relay winding YW is connected to be energized by the closing of a set of contacts X2 of the relay X, and has latching contacts Y1 so that once the relay Y is energized by the energizing of relay X, the relay Y remains in the actuated position until power is withdrawn by operation of the reset switch P. The relay winding XW has a set of contacts X1 which, when in the unenergized position, connects the winding in series with the contacts A and B of the meter (see FIGURE 1) and a meter-locking coil LC. It will be understood that the locking coil LC constitutes a portion of the meter relay M which is not shown in FIGURE 1 of the drawing, but is employed in a well known type of meter relay which is commonly available to latch the meter relay contacts once contact has been established, in order to prevent chattering or hunting. In the energized condition of contacts X1, the connection of the relay winding XW is made through contacts Y2; when relay Y is unenergized, the contacts X1 latch in the relay X so that relay X remains energized until power is withdrawn either by the energizing of relay Y or by operation of the reset switch P. The connection of the contacts Y2 is such that when relay Y and relay X are both energized, the connection of relay X is made in the same manner as when relay X is unenergized, i.e., through contacts A and B and the meter locking coil LC.

The relay X is of the delayed release type, i.e., one which holds for, say, one tenth of a second after power is withdrawn, and relay Y is of the delayed operating type, i.e., one in which the contacts are not tripped until the power has been applied for a similar time. It will thus be seen that of the four possible conditions obtainable with any pair of relays, the present system has three possible stable conditions and one transient condition. The condition wherein neither relay is energized is a stable one in which the operation of relay X is under the control of the meter relay contacts A and B. When the contacts A and B close, the circuit is placed in the unstable condition wherein relay X is energized but relay Y is not energized. Relay Y is energized at the end of the delay period of its operation. During this transient condition, the contacts A and B have no control over the energizing of the relay X. When the contacts of relay Y operate, however, control over relay X is restored to the contacts A and B.. It will be seen hereafter that these contacts will be open at this point, so that relay X opens after its delay period and the relays will remain in this stable condition until the contacts A and B again close. At this latter point there is established the third stable condition, in which both relays X and Y are energized. This condition will persist until the meter reset switch P is operated, since the series connection of the locking coil LC and the contacts A and B produce the effect that whenever the relay X is under the control of the contacts A and B, the energized position of the relay X is accompanied by locking of the contacts A and B by means of the coil C.

The manner of interconnection of the relays with each other and with the contacts A and B having been explained, the mode of operation of the device will be readily understood from the connections of further contacts of the relays X and Y. The timer T is powered in series with a normally closed pair of contacts X3 and a normally open pair of contacts Y3. The timer T thus runs only in the second stable position or condition mentioned above, i.e., the condition wherein relay Y is energized but relay X is not energized.

In the meter circuit, contacts Y4, when in the unenergized position, place control of the connections of the resistors R1, R2, and R3 in contacts X4; with relay X in the unenergized position, resistors R2 and R3 are unconnected and a short is placed across the resistor R1. In the unstable condition in which relay X is energized and relay Y is not yet energized, this short across the series resistor R1 is removed, and the series combination of R2 and R3 is shunted across the series combination of resistor R1 and the meter signal coil MC; this condition remains when the relay Y is energized.

It may now be seen that the over-all effect of the circuit of FIGURE 2 is that which is portrayed schematically in FIGURE 1. When the input signal, which commences at low magnitude, is impressed (with the switch S in the "on" position), there is no effect other than movement of the indicating needle until the signal reaches a magnitude sufficient to close the contacts A and B. At this time the relay X is actuated, thus connecting the resistance network consisting of R1, R2, and R3 in such a manner as to reduce the sensitivity of the meter by a factor of 10 (in the assumed example). Since the meter locking coil LC now carries no current, the contacts A and B are immediately broken and the reading of the meter M falls to 10 percent of its original value. At the end of the operating delay time of relay Y, power is removed from relay X and at the end of the release delay time of relay X, the timer T is actuated. (It will of course be understood that the delay times of the relays are small compared to the time intervals being measured.) When the contacts A and B again close, relay X is energized, thus stopping the timer, and the entire circuit remains in this condition until the meter reset switch P is manually activated in connection with a new timing operation.

It will be obvious to persons skilled in the art that the basic teachings of the invention may be employed in many devices superficially differing greatly from that illustrated, but nevertheless employing the basic principles of construction underlying the particular embodiment illustrated and described. Some of such modifications have already been mentioned, and many others will be readily apparent. In addition, less obvious alterations may be devised upon study. Accordingly, the scope of protection to be afforded the invention should not be limited by the particular embodiments illustrated and described, but should be determined from the appended claims.

What is claimed is:

1. A signal-controlled timer for measuring rate of change of an electrical quantity comprising a pair of input terminals, a pair of contacts having an open condition and a closed condition, means responsive to reaching of a fixed value by an electrical quantity impressed at said terminals to reverse the condition of the contacts, an elapsed time timer, means responsive to the first reversal of the condition of the contacts to again reverse the condition of the contacts to restore the original condition, change said fixed value and start the timer, and means responsive to a further reversal of the condition of the contacts to stop the timer, whereby the timer indicates the elapsed time for change of the electrical quantity between said values.

2. A signal-controlled timer for measuring the rate of change of an electrical quantity comprising a meter having a contact-making pointer and a stationary contact adapted to close a circuit upon rise of the pointer to a predetermined position, means for changing the sensitivity of the meter, an elapsed time timer, means responsive to a first closing of the circuit to start the timer and actuate the sensitivity-changing means, and means responsive to a second closing of the circuit to stop the timer.

3. A signal-controlled timer for measuring the rate of change of an electrical quantity comprising a meter having a contact-making pointer and a stationary contact adapted to close a circuit upon rise of the pointer to a predetermined position, a meter shunt, an elapsed time timer, means responsive to a first closing of the circuit to start the timer and switch the shunt into the meter circuit, and means responsive to a second closing of the circuit to stop the timer.

4. A signal-controlled timer for measuring the rate of change of an electrical quantity comprising a meter having a pointer contact and a stationary contact adapted to close a circuit, means for changing the sensitivity of the meter, a locking coil adapted to hold the contacts in engagement, an elapsed time timer, and first and second relays, the first having normally closed contacts in series with the timer and the second having normally open contacts in series with the timer and said contacts of the first, so that the timer is energized solely when only the second relay is energized, means including the contacts on at least one of the relays to energize both of the relays upon a first closing of the meter contacts, and to thereupon open the locking coil circuit and actuate the sensitivity-changing means and to thereupon de-energize only the first relay to start the timer, and means including the contacts on at least one of the relays to energize the first relay upon a second closing of the contacts to stop the timer, so that the timer indicates the elapsed time required for the change in the electrical quantity under measurement between the values represented by the first and second closings of the meter contacts.

5. A signal-controlled timer for measuring the rate of change of an electrical quantity comprising a meter having a pointer contact and a stationary contact adapted to close a circuit, means for changing the sensitivity of the meter, an elapsed time timer, and first and second relays having normally closed and normally open contacts, respectively, in series with each other and with the timer, means responsive to a first closing of the meter contacts to change the sensitivity of the meter and to energize the second relay and maintain it in the energized condition while the first is de-energized to operate the timer, and means responsive to a second closing of the meter contacts to energize the first relay to stop the timer.

6. A single-controlled timer for measuring the rate of change of an electrical quantity comprising a signal-controlled switch actuable in response to a given signal magnitude, an elapsed time timer, means responsive to a first actuation of the switch to change the sensitivity of the switch and thus again inactivate the switch and to energize the timer, and means responsive to a second actuation of the switch to stop the timer.

7. The timer of claim 6 wherein the switch is an electrical meter having a pointer contact and a stationary contact, and the means to change the sensitivity includes a shunt across the meter and a resistance in series with the meter.

8. The timer of claim 6 wherein the means to change the sensitivity of the switch includes a series impedance and a shunt impedance, so constructed and arranged that the impedance presented to the signal by the timer remains constant.

9. A signal-controlled timer for timing the interval between the occurrence of two values of a varying electrical signal comprising a switch having a first condition in which it is operable by a signal of the first value and a second condition in which it is operable by a signal of the second value, first and second relays each having a control element and controlled contacts and interconnected with each other and with the switch to have first, second, and third stable conditions, means responsive to operation of the switch in the first condition of the switch and of the relays to open the switch and change the conditions of the switch and the relays to the second condition thereof, means responsive to operation of the switch in the second condition of the switch and of the relays to change the condition of the relays to the third condition, an elapsed time timer, and means including contacts of the relays to operate the timer only in the second condition of the relays.

10. The timer of claim 9 wherein operation of the second relay is controlled by the first relay in the first condition but is thereafter independent thereof, operation of the first relay is controlled by the switch in all of said conditions, and operation of the second relay places the switch under control of the first relay, so that the switch remains closed independently of the electrical signal in said third condition.

11. A signal-controlled timer comprising a single signal-responsive switch responsive to the magnitude of a signal applied thereto to reverse the condition of its contacts upon reaching of an operating point, an interval timer, means responsive to a first reversal of said condition to start the timer and to alter the operating point in the direction to produce a second reversal of the condition and thus restore the original condition, and means responsive to a third reversal of condition occurring upon reaching of the altered operating point to stop the timer.

12. The timer of claim 11 wherein the switch is a meter having a moving indicator and a stationary contact.

References Cited in the file of this patent

UNITED STATES PATENTS

| | | |
|---|---|---|
| 2,216,737 | Crane | Oct. 8, 1940 |
| 2,400,190 | Clark | May 14, 1946 |
| 2,512,330 | Hendrich | June 20, 1950 |
| 2,544,685 | Jackson | Mar. 13, 1951 |
| 2,691,135 | Wooding | Oct. 5, 1954 |
| 2,743,418 | Nichols et al. | Apr. 14, 1956 |
| 2,870,408 | Draganjac | Jan. 20, 1959 |
| 2,937,335 | Toton et al. | May 17, 1960 |